(12) United States Patent
Viken et al.

(10) Patent No.: US 11,076,282 B2
(45) Date of Patent: Jul. 27, 2021

(54) TELECOMMUNICATIONS APPARATUS WITH A RADIO-LINKED SMART CARD

(71) Applicant: Norbit AblePay AS, Trondheim (NO)

(72) Inventors: Brynjar Viken, Trondheim (NO); Steinar Brede, Trondheim (NO)

(73) Assignee: Norbit AblePay AS, Trondheim (NO)

( * ) Notice: Subject to any disclaimer, the term of this patent is extended or adjusted under 35 U.S.C. 154(b) by 14 days.

(21) Appl. No.: 16/630,249

(22) PCT Filed: Jun. 29, 2018

(86) PCT No.: PCT/GB2018/051840
§ 371 (c)(1),
(2) Date: Jan. 10, 2020

(87) PCT Pub. No.: WO2019/012247
PCT Pub. Date: Jan. 17, 2019

(65) Prior Publication Data
US 2021/0112397 A1    Apr. 15, 2021

(30) Foreign Application Priority Data
Jul. 14, 2017 (GB) ...................................... 1711387

(51) Int. Cl.
*H04W 8/18* (2009.01)
*H04W 4/60* (2018.01)
(Continued)

(52) U.S. Cl.
CPC ......... *H04W 8/183* (2013.01); *H04L 63/0853* (2013.01); *H04W 4/60* (2018.02); *H04W 4/80* (2018.02); *H04W 12/06* (2013.01)

(58) Field of Classification Search
CPC ......... H04W 4/60; H04W 4/80; H04W 8/183; H04W 12/06; H04L 63/0853
(Continued)

(56) References Cited

U.S. PATENT DOCUMENTS 5,438,184 A    8/1995    Roberts et al.
8,060,139 B2    11/2011    Yaqub et al.
(Continued)

FOREIGN PATENT DOCUMENTS

CN    102663477    9/2012
CN    202486821    10/2012
(Continued)

*Primary Examiner* — Joel Ajayi
(74) *Attorney, Agent, or Firm* — Diederiks & Whitelaw, PLC.

(57) ABSTRACT

A telecommunications apparatus is provided which comprises a processing system, a cellular-network radio transceiver, a first radio module and a smart card. The smart card comprises a microcontroller, an electrical interface and a second radio module. The cellular-network radio transceiver and the first radio module are connected to the processing system by one or more electrical connections. The smart card is coupled to the cellular-network radio transceiver through the electrical interface and the processing system is arranged to use a radio communication link between the first radio module and the second radio module to communicate data with the microcontroller of the smart card. The smart card is configured to interrupt the processing system by sending data over the radio communication link.

20 Claims, 3 Drawing Sheets

(51) Int. Cl.
*H04L 29/06* (2006.01)
*H04W 12/06* (2021.01)
*H04W 4/80* (2018.01)

(58) Field of Classification Search
USPC .......................................... 455/550.1, 553.1
See application file for complete search history.

(56) References Cited

U.S. PATENT DOCUMENTS

| | | |
|---|---|---|
| 8,706,035 B2 | 4/2014 | Yaqub et al. |
| 2011/0183717 A1 | 7/2011 | Brede |
| 2011/0207506 A1 | 8/2011 | Haugli et al. |
| 2016/0110706 A1 | 4/2016 | Li et al. |

FOREIGN PATENT DOCUMENTS

| | | |
|---|---|---|
| CN | 103347105 | 10/2013 |
| CN | 204374997 | 6/2015 |
| WO | 2007/069901 | 6/2007 |

TELECOMMUNICATIONS APPARATUS WITH A RADIO-LINKED SMART CARD

CROSS-REFERENCE TO RELATED APPLICATIONS

This application represents the U.S. National Phase of International Application number PCT/GB2018/051840 entitled "Telecommunications Apparatus with a Radio-Linked Smart Card" filed 29 Jun. 2018, which claims benefit to Great Britain Application No. 1711387.9 filed 14 Jul. 2017, all of which are incorporated herein by reference.

BACKGROUND OF INVENTION

The present invention relates to telecommunications apparatus having a radio link to a smart card, and related methods.

Some telecommunications devices include built-in hardware secure elements to provide cryptographic and authentication services to software applications running on the devices. However, these are expensive and take up valuable space within what can be already densely packed devices. As such, there exists a need for a more efficient way of enabling software applications running on a telecommunications apparatus to access the functionality of a hardware secure element.

Telecommunications apparatus such as mobile telephones and machine-to-machine (M2M)-enabled equipment, which communicate over a cellular network, typically contain smart cards, such as SIMs or UICCs. These are typically provided by and remain the property of a network operator, and function as so called "secure elements", providing cryptographic key storage and performing cryptographic algorithms for authenticating a subscriber to the network operator.

However, within such communication apparatus, the smart card operates somewhat independently from the main processing system of the apparatus, so that the network operator can be confident in the integrity of the smart card, and so can be confident in the association between the smart card and a subscriber's account.

Consequently, communication between a smart card and the device or equipment in which the smart card is installed is typically carefully controlled by standards such as ETSI TS 102 221, ETSI TS 102 241, etc. It is not, in general, possible for software applications running on a telecommunications apparatus to access the full functionality of the smart card.

Furthermore, it is typically not possible for a conventional smart card to interrupt the processing system of the host device (such as a terminal or mobile phone), because of the command-and-response nature of the underlying communication specifications—e.g., ISO 7816, or the (U)SIM Application Toolkit/Card Application Toolkit (e.g. ETSI TS 102 223), or the Android UICC API—which dictates that the host device initiates data exchanges with the smart card. This means that a conventional smart card cannot trigger actions on, or send data to, the terminal or mobile phone at an arbitrary time, but must be polled first.

SUMMARY OF THE INVENTION

The present invention seeks to address these shortcomings.

When viewed from a first aspect, the present invention provides a telecommunications apparatus comprising:

a processing system;
a cellular-network radio transceiver;
a first radio module; and
a smart card comprising a microcontroller, an electrical interface, and a second radio module, wherein:
the cellular-network radio transceiver and the first radio module are connected to the processing system by one or more electrical connections;
the smart card is coupled to the cellular-network radio transceiver through the electrical interface;
the processing system is arranged to use a radio communication link between the first radio module and the second radio module to communicate data with the microcontroller of the smart card; and
the smart card is configured to interrupt the processing system by sending data over the radio communication link between the first radio module and the second radio module.

From a second aspect, the invention provides a method of operating a telecommunications apparatus, wherein the telecommunications apparatus comprises:

a processing system;
a cellular-network radio transceiver;
a first radio module; and
a smart card comprising a microcontroller, an electrical interface, and a second radio module, wherein the cellular-network radio transceiver and the first radio module are connected to the processing system by one or more electrical connections, and wherein the smart card is coupled to the cellular-network radio transceiver through the electrical interface, the method comprising:
the smart card interrupting the processing system by sending data over a radio communication link between the first radio module and the second radio module; and
the processing system communicating data with the microcontroller over the radio communication link between the first radio module and the second radio module.

Thus it will be appreciated by those skilled in the art that, in accordance with the present invention, the processing system of the telecommunications apparatus can use a radio link to communicate directly with the smart card, as an alternative to the processing system having to communicate with the smart card through a conventional electrical interface, typically via the cellular-network radio transceiver. This radio link can be used to enable the processing system to access the functionality of the smart card's microcontroller without the limitations that are typically placed upon conventional communications between the smart card and the processing system of the apparatus by the standards that specify the operation of the electrical interface and by limitations imposed by the cellular-network radio transceiver. (The provider of the smart card does not typically control the functionality of the cellular-network radio transceiver.) The smart card may act as, or is, a hardware secure element for the telecommunication apparatus. By avoiding the need for a separate built-in secure element—e.g., as part of the processing system—the cost and/or size of the apparatus may be reduced.

In this way, software applications running on the apparatus, such a banking app, may be able to make use of one or more cryptographic functions provided by the microcontroller of the smart card in a way that was not previously possible—e.g., to encrypt data using a symmetric encryption algorithm before storing the data on the device.

In addition, the use of the radio link between the smart card and the telecommunications apparatus enables greater flexibility because the smart card is configured to interrupt, or trigger an action on, the processing system of the telecommunications apparatus, by sending data over the radio communication link.

For example, the smart card may be configured to start a software application running on the processing system in response to the smart card interrupting the processing system. Additionally or alternatively, the smart card may be configured to cause the processing system to notify a user in response to the smart card interrupting the processing system.

The smart card may be configured to interrupt the processing system in response to the smart card receiving a message (e.g. an SMS message) via the cellular-network radio transceiver.

The radio communication link may be a Bluetooth™ link (e.g., a Bluetooth™ Low Energy link) and the smart card may be configured to interrupt the processing system by sending a Bluetooth™ advertisement frame or a Bluetooth™ beacon over the radio communication link. For example, using Bluetooth™, it is possible for an application on the processing system to be dormant (or running in the background)—e.g., when a screen of the apparatus is locked—and to be activated (or caused to display a notification on the locked screen) when the first radio module receives a Bluetooth™ beacon or Bluetooth™ advertisement frame from the second radio module. Thus, the processing system may be configured to execute a software application in a background state, and the apparatus may be configured to activate the software application when the smart card interrupts the processing system.

In some embodiments the telecommunications apparatus comprises a telephone or smartphone, although it could comprise any portable device (e.g. a tablet computer or a vehicle) or any non-portable device or appliance (e.g. a personal computer, a point of sale terminal or a television set).

The cellular-network radio transceiver may support communication by any appropriate cellular-network radio protocol, such as GSM, Edge, GPRS, UTMS, LTE, any other 3G/4G/5G protocol, etc. The cellular-network radio transceiver may comprise analog and/or digital circuitry. It may comprise one or more of its own processors, such as a baseband processor, separate from said processing system. It may comprise a memory, storing software for controlling the cellular-network radio transceiver to communicate with a cellular network.

The first and/or second radio modules may be short-range, or personal-area network, radio modules. They may support radio communication using one or more of: Wireless USB, Bluetooth™, Z-Wave, or Zigbee. However, in a preferred set of embodiments, the first radio module is a Bluetooth™ radio module (i.e., supporting communication according to a Bluetooth™ standard, although not necessarily exclusively). The second radio module may be a Bluetooth™ radio module. The radio communication link between the first and second radios may then be a Bluetooth™ radio link. References to Bluetooth™ herein should be understood as encompassing any past, current or future radio standard published by the Bluetooth™ Special Interest Group, including Bluetooth Low Energy™. Use of the Bluetooth™ standard is desirable in many situations because it is common for commercially available telecommunication devices to be equipped already with Bluetooth™ radio modules. Thus, fewer design alterations and less additional hardware may be required to use the Bluetooth™ radio module of an existing commercially-available telecommunications device as the first radio module in embodiments of the invention.

The radio communication link between the first and second radio modules may be secured using encryption. This can protect it from eavesdropping and from man-in-the-middle attacks.

The smart card may be configured to authenticate a subscriber to a network operator—e.g., via the cellular-network radio transceiver. The electrical interface may comprise a plurality of metal contacts. The apparatus may comprise a plurality of sprung metal connectors for engagement with the metal contacts. Alternatively, the electrical interface could, in some embodiments, comprise a permanently bond—e.g., one or more soldered connections. The smart card may be a SIM, USIM, UICC, or other subscriber identification card. Preferably the smart card has the form factor of a Universal Integrated Circuit Card (UICC). The smart card may be substantially planar, although this is not essential. Preferably the electrical interface is compliant with the ISO/IEC 7816 standard. In some embodiments, there is no wired connection between the smart card and the processing system, except through the cellular-network radio transceiver—i.e., all wired communications between the processing system and the smart card have to go through the cellular-network radio transceiver. The cellular-network radio transceiver and/or the microcontroller may be arranged to support data communication according to the ISO/IEC 7816 standard.

In some embodiments the hardware components of the processing system, cellular-network radio transceiver, and first radio module are integrally bonded to each other. They may be contained in a common housing. The smart card may be removable—e.g., from the processing system or from such a common housing. The telecommunications apparatus may comprise a slot in which the smart card is removably located. This allows the same smart card to be interchangeably used in multiple telecommunications apparatuses, or to be easily replaced within the same telecommunications apparatus, if required.

In some embodiments, the telecommunications apparatus further comprises a battery. The battery is preferably separate from the smart card. The apparatus is preferably arranged for the battery to power one or more or all of: the processing system, cellular-network radio transceiver, and the first radio module. The apparatus is preferably arranged to power the smart card via the electrical interface—preferably from said battery. Thus, the apparatus is preferably arranged to power the microcontroller and/or the second radio module from said battery. In this way it is not necessary for the smart card to have its own power supply, which avoids additional cost and allows it to work indefinitely.

In some embodiments, the telecommunications apparatus further comprises a memory in which a software application may be stored. The processing system may include a software application stored in said memory. The processing system may comprise one or more processors. The software application may include instructions that cause the processing system to communicate with the microcontroller of the smart card via the radio communication link. The communication between the processing system and the microcontroller may form part of an authentication process between the software application and a remote server—e.g., between a gaming app and a remote gaming server.

In some embodiments the microcontroller on the smart card comprises a hardware secure element storing at least one private cryptographic key. The hardware secure element may comprise a hardware cryptographic unit. It may comprise secure memory—e.g., for storing one or more cryptographic keys. The microcontroller may be configured to perform at least one cryptographic algorithm. The second radio module may be integrated with the microcontroller—e.g., on a single silicon chip—or it may be separate, but connected electrically.

The processing system may communicate any appropriate data with the microcontroller of the smart card, over the radio communication link. The data may travel to the smart card, or from the smart card, or may be a bi-directional data exchange. The data may comprise an instruction or command, such as an instruction to sign, encrypt, decrypt, verify or authenticate. The data may additionally or alternatively comprise a number or a message, such as plaintext data, ciphertext, a cryptographic key or a cryptographic hash. The data may cause the microcontroller to perform a processing operation, such as a cryptographic operation.

The processing system may be arranged to receive information, such as an authentication challenge, from a remote server, and pass the information to the microcontroller of the smart card via the radio communication link. The microcontroller of the smart card may be arranged to receive the information and perform a cryptographic algorithm based on the information—e.g., to generate a response to the authentication challenge. In some embodiments the microcontroller is arranged to send an output of the cryptographic algorithm to the processing system via the radio communication link. The processing system may be arranged to communicate this output (or information derived therefrom) to the remote server. The apparatus may be arranged to use the cellular-network radio transceiver to communicate the output to the remote server.

The telecommunications apparatus may comprise one or more further radio transceivers, which may be arranged to communicate with a base station or with a remote server. For example, the telecommunications apparatus may also comprise a WiFi radio.

In one set of embodiments, the first radio module acts as a Bluetooth™ master according to a version of the Bluetooth™ standard. The second radio module may act as a Bluetooth™ slave according to a version of the Bluetooth™ standard. However, in other embodiments these roles may be reversed.

In embodiments where the radio communication link is secured using encryption, this security may be provided at a low level, using a secure pairing protocol between the first and second radio modules, e.g. as described in the Bluetooth™ Core Specification version 4.2. Additionally or alternatively, data sent via the radio communication link may be encrypted at an application level, independent of any link-layer encryption.

In some embodiments, a key-exchange process is used in encrypting the radio communication link. This key-exchange may involve a remote party such as a network operator or remote service provider. The remote party may store a cryptographic key on the smart card—e.g., during manufacture—and may also communicate the same cryptographic key to the processing system—e.g., via an out-of-band (OOB) channel, for example by an SMS message and/or via email and/or via user input.

Thus the telecommunications apparatus may be arranged to receive a first cryptographic key (e.g., via the cellular-network radio transceiver, or another wireless input such as WiFi) and to use said cryptographic key for securing communication over the radio communication link between the first radio module and the second radio module. The smart card may store, or be able to store, a second cryptographic key for securing communication over the radio communication link between the first radio module and the second radio module. The first key may be identical to the second key, or they may form an asymmetric key pair. Key-exchange via OOB communication (i.e., not over the radio communication link between the first radio module and the second radio module) can prevent malicious third party eavesdropping or attacks.

The Applicant has recognised that the ability of the smart card to interrupt the processing system on the host device is not essential in all embodiments of the invention and therefore, when viewed from a further aspect, the present disclosure also provides a telecommunications apparatus comprising:

a processing system;
  a cellular-network radio transceiver;
  a first radio module; and
  a smart card comprising a microcontroller, an electrical interface, and a second radio module,
  wherein:
  the cellular-network radio transceiver and the first radio module are connected to the processing system by one or more electrical connections;
  the smart card is coupled to the cellular-network radio transceiver through the electrical interface; and
  the processing system is arranged to use a radio communication link between the first radio module and the second radio module to communicate data with the microcontroller of the smart card.

From a further aspect, the invention provides a method of operating a telecommunications apparatus, wherein the telecommunications apparatus comprises:

a processing system;
  a cellular-network radio transceiver;
  a first radio module; and
  a smart card comprising a microcontroller, an electrical interface, and a second radio module,
  wherein the cellular-network radio transceiver and the first radio module are connected to the processing system by one or more electrical connections, and wherein the smart card is coupled to the cellular-network radio transceiver through the electrical interface,
  the method comprising:
  the processing system communicating data with the microcontroller over a radio communication link between the first radio module and the second radio module.

Any of the features disclosed above with reference to the earlier aspects may also be optional features of embodiments of these two aspects. More generally, features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE PREFERRED EMBODIMENTS

Figure 1:
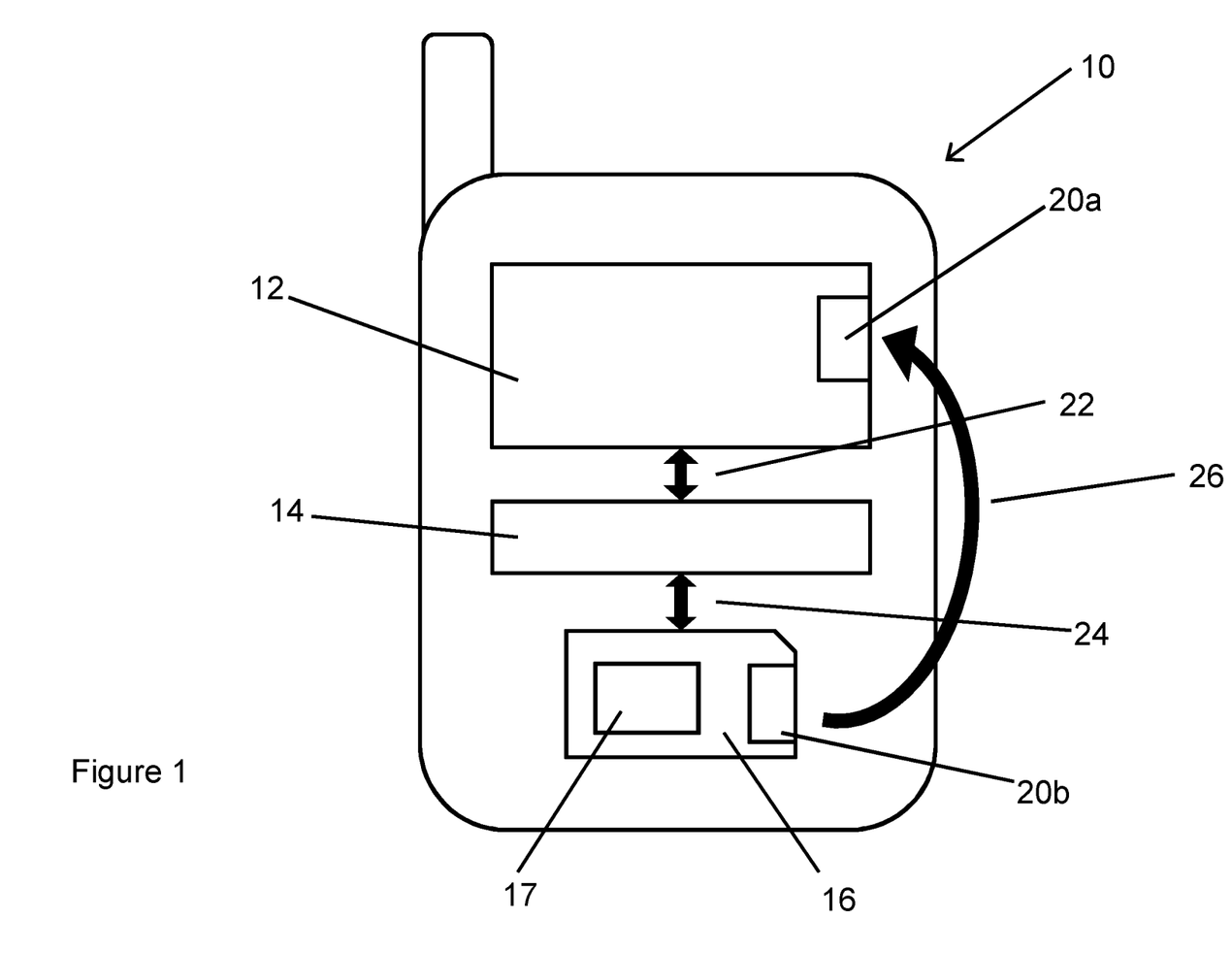
FIG. 1 is a schematic illustration of a mobile communication device in accordance with an embodiment of the present invention.

FIG. 1 shows a mobile communication device 10, such as a GSM- and UTMS-enabled smartphone, according to an embodiment of the present invention.

The mobile communication device 10 has an application processor 12, a radio baseband processor 14 (which, in combination with appropriate analogue radio components, forms a cellular-network radio transceiver) and a Universal Integrated Circuit Card (UICC) 16, as well as other conventional components, such as amplifiers, oscillators, filters, a battery, display screen, etc. (not shown). The hardware of the mobile communication device 10, with the exception of the removable UICC 16, is conventional. However, the UICC 16, and the software and configuration of the mobile communication device 10, are not conventional, as explained below.

The application processor 12 is a microcontroller arranged to execute an operating system and software applications, as is conventional in the art. It can control a user interface on the device 10. Applications might include telephony applications, web browsers, mobile banking apps, etc.

The radio baseband processor 14 is responsible for controlling a GSM or UMTS radio link with a remote base station, as is conventional in the art. It could be a Qualcomm™ Snapdragon X16 LTE modem, for example, or any other appropriate baseband processor.

The application processor 12 and the radio baseband processor 14 may be separate components (e.g., separate silicon chips), or they might be integrated onto a single chip such as the Qualcomm™ Snapdragon 835.

The application processor 12 is arranged to send and receive information to and from the baseband processor 14 via a communication link 22. The application processor 12 includes a first Bluetooth™ low energy module (BLE) 20a, which can be controlled by the application processor 12 to send and receive information wirelessly, acting as a Bluetooth™ master according to any suitable version of the Bluetooth™ standard.

The UICC 16 is a smart card comprising a hardware secure element 17 (e.g. implemented using software executing on a microcontroller) and other conventional components, supporting SIM and USIM applications. However, it also contains an integrated, second Bluetooth™ low energy (BLE) module 20b, acting in a Bluetooth™ slave mode. The second BLE module 20b can communicate with the hardware secure element 17 and with the rest of the UICC 16. The hardware secure element 17 comprises a memory for storing cryptographic keys and other confidential data, and circuitry for carrying out cryptographic algorithms. The UICC 16 is connected to the baseband processor 14 via an ISO/IEC 7816 standard-compliant connection 24, which provides electrical power to the UICC 16 (and consequently to the second BLE module 20b) and also enables data communication with the baseband processor 14.

Routine communications between the UICC 16 and the application processor 12, e.g. relating to standard GSM/UMTS authentication operations, occur via the baseband processor 14. The baseband processor 14, however, does not typically allow the application processor 12 to send arbitrary messages to the UICC 16, but only commands that are contained within a predefined set of commands.

As a result, the traditional data communication path between the UICC 16 and the application processor 12 (via the baseband processor 14) can only be used for basic cellular/telephony activities, for example network authorisation when a user of the mobile communication device 10 makes a phone call or sends an SMS message. The maximum communication rate is also limited, by the ISO/IEC 7816, standard to approximately 16-50 kbits per second.

While the (U)SIM Application Toolkit/Card Application Toolkit (e.g. ETSI TS 102 223) supports basic user interaction, such as displaying text messages, displaying menus, receiving user input, etc., these commands cannot easily be integrated in an application, and it is not mandatory for a mobile phone to support all of the features defined in the standards. So, typically, only a limited set of commands is available to an application processor.

The first and second BLE modules 20a, 20b are paired such that they can communicate with each other via a Bluetooth™ link 26. The same protocol and data-rate limitations that are placed on the traditional communication path between the application processor 12 and the UICC 16 (via the communication link 22 and the standard connection 24) do not apply to the Bluetooth™ link 26, and as such there is significant benefit to be gained from this internal radio communication path.

The effective data rate of communication between the application processor 12 and the UICC 16, via the Bluetooth™ link 26, can be up to 2 Mbits per second, which is tens or hundreds of times higher than the 16-50 kbits per second achievable via the wired ISO 7816 link. This additional speed can be particularly useful when transferring large amounts of data to or from the UICC 16—e.g., when using the UICC 16 to encrypt or decrypt a large document.

As described above, the second BLE module 20b is physically located on the UICC 16, and is communicatively coupled to the hardware secure element 17, which is also located on the UICC 16. The radio baseband processor 14 does not typically allow the hardware secure element 17 to be directly addressed by the application processor 12.

However the provision of the first and second BLE modules 20a, 20b enables a two-way communication path between the hardware secure element 17 and the application processor 12 via the Bluetooth™ link 26. The application processor 12 can send arbitrary commands directly to the hardware secure element 17 over the Bluetooth™ link 26, thereby enabling security functions of the hardware secure element 17 to be used by applications running on the application processor 12, such as a third-party banking app.

The ISO/IEC 7816 standard requires the UICC 16 to be polled in order to carry out actions, and does not allow the UICC 16 to initiate communication with the rest of the mobile device 10. The Bluetooth™ link 26, however, allows the UICC 16 to generate interrupts and trigger applications to run or perform desired actions on the application processor 12, something that is impossible using traditional communication path. A telecoms company may, for instance, want to push a firmware update to users' smartphones, which requires user agreement.

Furthermore, because the second BLE module 20b is integrated with the UICC 16, it can grant the application processor 12 direct access (via the Bluetooth™ link 26, rather than via the baseband processor 14) to cellular communication protocols such as Unstructured Supplementary Service Data (USSD) or Short Message Service (SMS). This can allow an application running on the application processor 12 to, for example, send an encrypted SMS message. The UICC 16 can have easier access to "baseband near" protocols than is traditionally available using mobile-phone APIs. For instance, traditionally, USSD is not accessible from software applications on a mobile phone, but may be preferable to SMS in some situations because it has better real-time properties than SMS (i.e., message delivery has only a small delay); also, USSD messages sent to certain address ranges will be routed to a home network of the (U)SIM.

The Bluetooth™ link 26 is preferably a secure link, so that it is protected from eavesdropping and from man-in-the-middle attacks. It is desirable that reading an ICCID (Integrated Circuit Card Identifier) from the UICC 16 is not carried out over an open radio link, for example.

This security could be provided over an insecure Bluetooth connection—e.g., using known cryptographic protocols such as a key-exchange protocol, which may involve a remote party such as a network operator or remote service provider.

Alternatively, the link 26 could be secured at a lower level—e.g., using the enhanced Bluetooth Low Energy™ (BLE) Secure Connections pairing model, as described in the Bluetooth™ Core Specification version 4.2, to establish a secure Bluetooth link. The UICC BLE radio module 20b may operate in "Secure Connections Only mode" and only accept connections that use LE Security Mode 1 Level 4 (i.e. Authenticated LE Secure Connections pairing with encryption; for this, one of the following pairing methods should be used: Numeric Comparison, Passkey Entry, or Out Of Band).

Depending on how the pairing is performed, the BLE secure connection pairing/bonding may also mutually authenticate the UICC 16 and the main application processor 12; e.g. if OOB (out of band) pairing is used a remote backend party could send an OOB secret to the UICC 16 in an encrypted SMS, while an application running on the application processor 12 could request the OOB secret over a secure encrypted IP connection. Numeric comparison and passkey entry could also be used to perform mutual authentication without involving a remote backend—e.g., by a user entering a passkey in the software application running on the main processor 12 and entering the same passkey to the UICC 16 via a SIM-toolkit menu, or by a using comparing and approving numeric values both in an app (for the first BLE radio module 20a) and using a SIM-toolkit interface (for the second BLE radio module 20b).

Once a secure Bluetooth™ link 26 (protected from man in the middle, passive eavesdropping, etc.) is established, an application or operating system running on the application processor 12 could perform additional steps to verify the link 26—e.g. by performing a challenge-response request involving a backend remote party.

Because this novel UICC 16 enables any phone equipped with a Bluetooth™ radio to communicate with the secure element 17, this can allow, for example, the development of applications for the mobile device 10 that use the secure element 17 for authentication, which can improve the security of the applications. The security functions of the hardware secure element 17 include secure authentication of a user, an example case of which is illustrated in FIG. 2.

Figure 2:
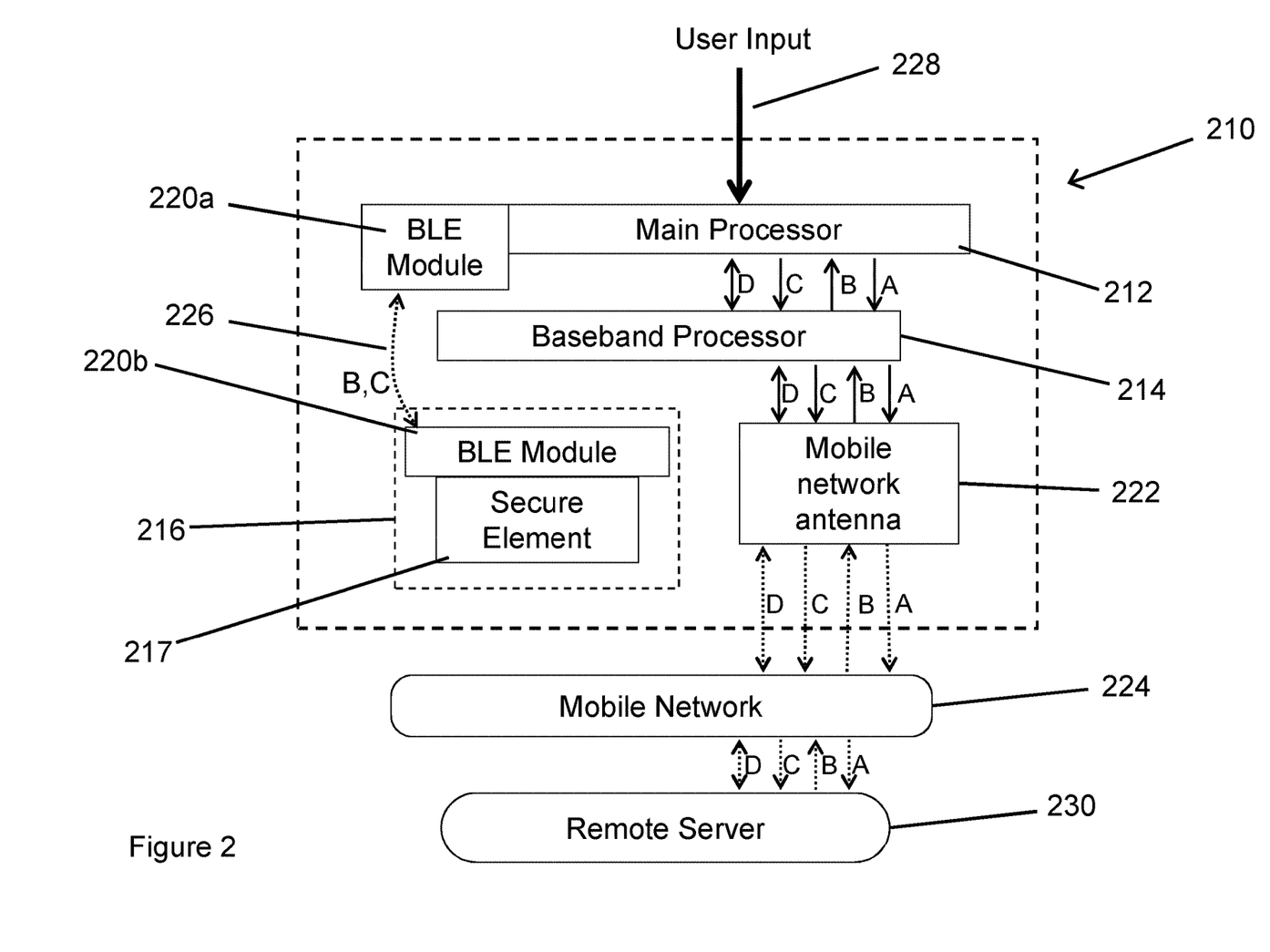
FIG. 2 shows an example method of authentication using a mobile communication device in accordance with an embodiment of the present invention.

FIG. 2 illustrates a method of authenticating a user to a remote server using a Bluetooth™ enabled UICC 216. It shows a mobile telephone 210, which is a particular example of the more generic mobile communication device 10 described above. The mobile telephone 210 comprises a main processor 212 (corresponding to the application processor 12 of FIG. 1), a baseband processor 214, a first Bluetooth™ Low Energy module 220a, a Universal Integrated Circuit Card (UICC) 216 and a mobile network antenna 222.

The first BLE module 220a can communicate with the main processor 212. The UICC 216 includes a second BLE module 220b and a hardware secure element 217. The hardware secure element 217 comprises a memory for storing a private key, and circuitry for performing cryptographic algorithms.

In this example interaction, a user provides inputs 228 to the main processor 212 that command the main processor 212 to run a banking or social media application for which authentication with a remote server 230 is required of the user. In order to verify the user's identity to the third party (i.e. the provider of the application), the user inputs a username "A" to the application (in some instances this identifying information may be stored in a memory on the mobile communication device 210 such that no user input is required). This username is transmitted, via the baseband processor 214 and the mobile network antenna 222, to a remote server 230 over a mobile communication network 224. The remote server 230 is operated by the bank or social-media provider that wishes to authenticate the user of the application.

The remote server 230 has stored in a memory the same private key that is stored in the hardware secure element of the UICC 216. The remote key is associated in the memory with the unique username "A", and on receipt of the username "A", it uses a cryptographic algorithm to generate, using the associated private key, a challenge "B" and an expected response. The challenge "B" is transmitted via the mobile network 224 to the mobile communications device 210 wherein it is received by the main processor 212 via the mobile network antenna 222 and the baseband processor 214.

The first BLE module 220a subsequently transmits the challenge "B" via a Bluetooth™ link 226 to the second BLE module 220b, which communicates it to the hardware secure element 217. The hardware secure element 217 generates a response "C" based upon the stored private key, which it then transmits, again via the Bluetooth™ link 226, to the main processor 212.

The main processor 212 then transmits the response "C" back to the remote server 230, which compares it to the expected response. If the responses match, the remote server 26 then begins a secure session, D, satisfied that the user has been successfully authenticated. The user may then, for example, begin to use the banking functions of the banking application.

Of course, any other suitable authentication mechanism could be used instead; for example, the remote server 230 could store a public key and authenticate the user through an asymmetric cryptographic protocol. The entire user authentication process may involve no user input at all, or may involve the user also inputting additional information, for example a passcode, which is transmitted along with the username "A" to the remote server 230.

Wireless communication is susceptible to malicious interference. While the Bluetooth™ standard incorporates encryption, it may be important to ensure that the Bluetooth™ link 226 has indeed been established with the correct UICC 216, and not with a rogue external device. Similarly, it may be desirable to ensure that no external device can connect to the UICC 216.

Figure 3:
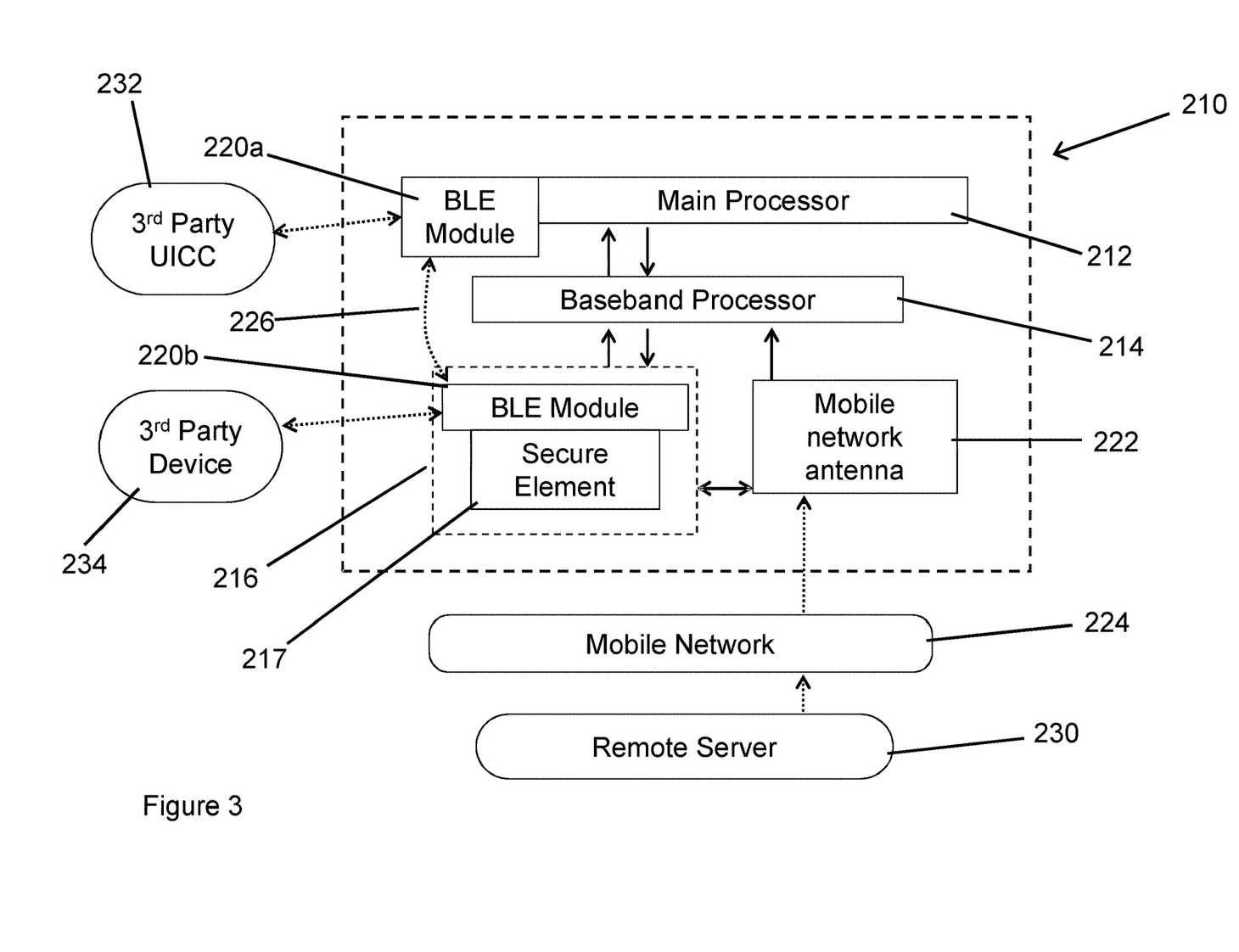
FIG. 3 illustrates example verification procedures for a mobile communication device in accordance with an embodiment of the present invention.

FIG. 3 illustrates verification procedures which may be used to verify the authenticity of the Bluetooth™ link 226.

In order to verify that the Bluetooth™ link 226 is indeed established between the first BLE module 220a and the second BLE module 220b of the UICC 216, rather than between the first BLE module 220a and a Bluetooth™ enabled malicious third party UICC 232, the baseband processor 214 queries the UICC 216 for its Integrated Circuit Card ID (ICCID) via the traditional ISO/IEC 7816-compliant wired communication path. In certain embodiments of the invention, the UICC 216 is also queried for its ICCID via the Bluetooth™ link 226. This ID is unique to each UICC and therefore, if the two numbers match, the user, or a software application running on the mobile phone 210, can be confident that the second BLE module 220b has paired with the UICC 216 inside the phone 210, rather than with the third-party UICC 232 that is not also connected to the baseband processor 214.

In order to ensure that a Bluetooth™ link is not established between a malicious third-party device 234 and the UICC 216, when authentication takes place, an additional step may be taken whereby an SMS message is sent by the remote server 230 to the phone number associated with the UICC 216 in the mobile phone 210. This SMS contains an access code, which an application attempting to authenticate requires in order to complete authentication. This additional step requires that for a successful authentication, the UICC 16 must be in both Bluetooth™ communication with the main processor 212, and in cellular communication via the baseband processor 214, so that it can receive the SMS. So long as the communication between the application (running on the main processor 212) and the remote server 230 is secured (e.g., using some well know approach) to limit the possibility of an attacker receiving the message, and so long as the software application itself has some security, a malicious third-party device can, at least in theory, only compromise the Bluetooth™ link. This is because an encrypted message sent to the UICC 216 via the baseband processor 214 cannot easily be received and decrypted by an attacker. The access code could be the OOB secret mentioned above if BLE Security Mode 1 Level 4 is used to establish the Bluetooth™ link 226.

The invention claimed is:

1. A cellular telecommunications apparatus comprising:
    a processor;
    a cellular-network radio transceiver;
    a first radio transceiver; and
    a smart card comprising a microcontroller, an electrical interface, and a second radio transceiver,
wherein:
    the cellular-network radio transceiver and the first radio transceiver are connected to the processor by one or more electrical connections;
    the smart card is coupled to the cellular-network radio transceiver through the electrical interface;
    the processor is arranged to use a radio communication link between the first radio transceiver and the second radio transceiver to communicate data with the microcontroller of the smart card; and
    the smart card is configured to receive a message directly from a remote radio transceiver, independently of the cellular-network transceiver and independently of the first radio transceiver, and, in response to the smart card receiving a message from the remote radio transceiver, trigger an action on the processor by sending data over the radio communication link from the second radio transceiver to the first radio transceiver, wherein said first radio transceiver communicates only with the second radio transceiver while said data is being sent, wherein the data comprises a message that interrupts the processor module.

2. The telecommunications apparatus as claimed in claim 1, configured to start a software application running on the processor in response to the smart card interrupting the processor.

3. The telecommunications apparatus as claimed in claim 1, configured to cause the processor to notify a user in response to the smart card interrupting the processor.

4. The telecommunications apparatus as claimed in claim 1, wherein the smart card is configured to interrupt the processor in response to the smart card receiving a message via the cellular-network radio transceiver.

5. The telecommunications apparatus as claimed in claim 1, wherein the smart card is configured to interrupt the processor by sending a Bluetooth™ advertisement frame or a Bluetooth™ beacon over the radio communication link.

6. The telecommunications apparatus as claimed in claim 1, wherein the smart card is a hardware secure element, SIM, USIM or UICC for the telecommunication apparatus.

7. The telecommunications apparatus as claimed in claim 1, wherein the telecommunications apparatus comprises a telephone.

8. The telecommunications apparatus as claimed in claim 1, wherein the first and second radio transceivers are personal-area network radio transceivers.

9. The telecommunications apparatus as claimed in claim 1, wherein the first and second radio transceivers are Bluetooth™ radio transceivers, and said radio communication link is a Bluetooth™ radio link.

10. The telecommunications apparatus as claimed in claim 1, wherein the smart card is configured to authenticate a subscriber to a network operator, via the cellular-network radio transceiver.

11. The telecommunications apparatus as claimed in claim 1, wherein the electrical interface comprises a plurality of metal contacts and the apparatus comprises a plurality of sprung metal connectors for engagement with the metal contacts.

12. The telecommunications apparatus as claimed in claim 1, further comprising a slot in which the smart card is removably located.

13. The telecommunications apparatus as claimed in claim 1, further comprising a battery, separate from the smart card, and being arranged to power the smart card from the battery via the electrical interface.

14. The telecommunications apparatus as claimed in claim 1, further comprises a memory storing a software application, the software application comprising instructions for causing the processor to communicate with the microcontroller of the smart card via the radio communication link.

15. The telecommunications apparatus as claimed in claim 14, wherein the software application comprises instructions for causing the processor to communicate with the microcontroller of the smart card, via the radio communication link, as part of an authentication process between the software application and a remote server.

16. The telecommunications apparatus as claimed in claim 1, wherein the processor is arranged to instruct the microcontroller of the smart card, over the radio communication link, to perform a cryptographic operation.

17. The telecommunications apparatus as claimed in claim 1, arranged to secure the radio communication link between the first radio transceiver and the second radio transceiver using encryption.

18. The telecommunications apparatus as claimed in claim 1, wherein the smart card is arranged to store a cryptographic key for securing communication over the radio communication link between the first radio transceiver and the second radio transceiver.

19. The telecommunications apparatus as claimed in claim 1, wherein the apparatus is arranged to receive a cryptographic key and to use the cryptographic key for securing communication over the radio communication link between the first radio transceiver and the second radio transceiver.

20. A method of operating a cellular telecommunications apparatus, wherein the telecommunications apparatus comprises:
  a processor;
  a cellular-network radio transceiver;
  a first radio transceiver; and
  a smart card comprising a microcontroller, an electrical interface, and a second radio transceiver,
wherein the cellular-network radio transceiver and the first radio transceiver are connected to the processor by one or more electrical connections, and wherein the smart card is coupled to the cellular-network radio transceiver through the electrical interface,
the method comprising:
  the smart card receiving a message directly from a remote radio transceiver independently of the cellular-network transceiver and independently of said first radio transceiver;
  in response to the smart card receiving said message from the remote radio transceiver, the smart card triggering an action on the processor by sending data over a radio communication link from the second radio transceiver to the first radio transceiver, wherein said first radio transceiver communicates only with the second radio transceiver while said data is being sent, wherein the data comprises a message that interrupts the processor; and
  the processor communicating data with the microcontroller over the radio communication link between the first radio transceiver and the second radio transceiver.

* * * * *